(12) United States Patent
Arnold et al.

(10) Patent No.: US 8,484,757 B2
(45) Date of Patent: Jul. 9, 2013

(54) DEVICE FOR OSCILLATION EXCITATION OF AN ELASTIC BAR FASTENED ON ONE SIDE IN AN ATOMIC FORCE MICROSCOPE

(75) Inventors: Walter Arnold, Saarbrücken (DE); Kerstin Meder, Dillingen (DE); Ute Rabe, Saarbrücken (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 758 days.

(21) Appl. No.: 12/063,588

(22) PCT Filed: Jun. 30, 2006

(86) PCT No.: PCT/EP2006/006382
§ 371 (c)(1),
(2), (4) Date: Sep. 30, 2010

(87) PCT Pub. No.: WO2007/019913
PCT Pub. Date: Feb. 22, 2007

(65) Prior Publication Data
US 2011/0010809 A1    Jan. 13, 2011

(30) Foreign Application Priority Data
Aug. 12, 2005 (DE) .......... 10 2005 038 245

(51) Int. Cl.
*G01Q 60/24* (2010.01)
(52) U.S. Cl.
USPC .......... 850/33; 73/104; 73/105; 850/37; 850/38; 850/39; 850/40

(58) Field of Classification Search
USPC .......... 850/21, 33, 37, 38, 39, 40; 73/104, 73/105
See application file for complete search history.

(56) References Cited

U.S. PATENT DOCUMENTS 5,581,083 A * 12/1996 Majumdar et al. .......... 850/30
5,713,667 A    2/1998 Alvis et al.
(Continued)

FOREIGN PATENT DOCUMENTS

| DE | 103 07 561 A1 | 9/2004 |
| JP | 2000266657 A | 9/2000 |

OTHER PUBLICATIONS

Chui, B.W., et al: "Low-Stiffness Silicon Cantilevers with Integrated Heaters and Piezoresistive Sensors for High-Density AFM Thermomechanical Data Storage", Journal of Microelectromechanical Systems, vol. 1, No. 1, Mar. 1998, pp. 69-78.

(Continued)

*Primary Examiner* — Nicole Ippolito
(74) *Attorney, Agent, or Firm* — Antonelli, Terry, Stout & Kraus, LLP.

(57) ABSTRACT

A device for oscillation excitation of a leaf spring, which is fastened on one side in an atomic force microscope (AFM) and comprises semiconductor material, which has no piezoelectric properties, a free end to which a tip is attached, which is brought into contact with a sample surface to be examined. The present invention has the leaf spring connected at least sectionally to a metal layer to form a Schottky contact, and an electrical voltage or field source is provided, which generates an electrical AC voltage a vicinity or area of the Schottky contact.

28 Claims, 7 Drawing Sheets

U.S. PATENT DOCUMENTS

| | | | |
|---|---|---|---|
| 5,923,033 A | 7/1999 | Takayama et al. | |
| 6,211,540 B1 | 4/2001 | Takahashi et al. | |
| 7,841,015 B2 * | 11/2010 | Arnold et al. | 850/44 |
| 2003/0025498 A1 * | 2/2003 | Imai et al. | 324/244 |
| 2003/0067308 A1 * | 4/2003 | Bonnell et al. | 324/662 |
| 2006/0238206 A1 | 10/2006 | Eng et al. | |
| 2007/0268808 A1 * | 11/2007 | Culver et al. | 369/126 |
| 2008/0254651 A1 * | 10/2008 | Mathieu et al. | 439/66 |

OTHER PUBLICATIONS

Lange, D., et al: "Parallel Scanning AFM with On-Chip Circuitry in CMOS Technology", Proceedings of the IEEE Micro Electro Mechanical Systems, 1999 (MEMS'99), pp. 447-452 (Jan. 1999).

* cited by examiner

DEVICE FOR OSCILLATION EXCITATION OF AN ELASTIC BAR FASTENED ON ONE SIDE IN AN ATOMIC FORCE MICROSCOPE

BACKGROUND OF THE INVENTION

1. Field of the Invention

The present invention relates to a device for oscillation excitation of an elastic bar, which is fastened on one side in an atomic force microscope (AFM) and comprises semiconductor material, which does not have piezoelectric properties and on a free end thereof a tip is attached, which may be brought into contact with a sample surface to be studied.

2. Description of the Prior Art

With the development of atomic force microscopy (AFM), great progress has been achieved in the characterization of surface properties. For the first time, it is possible with the aid of atomic force microscopy (AFM) to obtain information about surfaces and surface-proximal areas of greatly varying samples and components at a resolution of nanometers down to individual atoms.

Atomic force microscopes are commercially available. The sensor comprises a small leaf spring of approximately 100 μm to 500 μm length having a tip which is scanned over the sample using piezoelectric actuating elements. A position sensor measures the deflection of the spring. This position sensor frequently comprises a laser diode and a position-sensitive photodiode. The laser beam is focused on the reflective rear side of the leaf spring, reflected there, and directed to the photodiode. A deflection of the spring causes a position change of the laser beam and thus a change of the photovoltage. The topography of the surface is imaged in that via a closed loop, the sensor or the sample is tracked perpendicularly to the sample surface, that is, in the z direction, during scanning in such a way that the deflection of the spring remains constant. The z voltage is coded as a color value and displayed via a computer.

Dynamic types of operation, in contrast, in which the leaf spring is set into oscillation, have increasingly gained significance in atomic force microscopy, because with their use sensitive samples may be imaged without damage and because physical properties of the sample surface may also be derived, in addition to the surface topography, from the amplitude and phase of the leaf spring oscillation.

The leaf spring is set into oscillations at or near its resonance frequency and positioned over the sample surface, so that the leaf spring only contacts the sample surface via its tip for a very short time of its oscillation period. Grinding of the tip over the sample is thus prevented, which is advantageous when studying weakly bound or soft sample surfaces. In contrast to the contactless mode, the oscillation amplitude is large enough to overcome the adhesion forces of the sample surface. Surface structures may be identified and measured using amplitude variation. If the sample tip is guided over a protrusion, for example, the amplitude of the oscillation decreases, in contrast, if it runs into a depression, the amplitude automatically rises.

With the use of so-called atomic force acoustic microscopy (AFAM), local elastic properties of materials may be imaged and quantitatively determined at a local resolution of a few nanometers. This is a dynamic AFM operating mode, in which the fact is exploited that a leaf spring oscillating at its resonance frequency may detect extremely small changes in the tip-sample interactions.

The oscillation excitation of the leaf spring is of special significance for this purpose. It is thus to be ensured that the oscillation behavior predefined by the leaf spring geometry and its intrinsic elasticity is impaired as little as possible by the means and technologies to be used in the scope of oscillation excitation.

In the following, an overview will be given of known excitation technologies of AFM leaf springs:

Because the leaf spring of an atomic force microscope, as noted at the beginning, is fastened and/or clamped on one side in a retainer, it suggests an oscillator system required for oscillation excitation of the leaf spring be integrated in the area of the retainer itself. Preferably, piezoelectric oscillator systems are used for this purpose, which are capable of also setting at least partial areas of the retainer itself into oscillation in addition to the leaf spring. A disadvantage of this type of excitation is that the natural resonance of the retainer may superimpose on the natural resonance of the elastic bar, which one wishes to measure. In addition, in this type of oscillation excitation, limits are set in regard to achievable resonance modes along the leaf spring.

Another possibility for oscillation excitation of the leaf spring comprises attaching an oscillation system directly on the leaf spring, to thus avoid interfering oscillation excitation in the area of the retainer.

It is suggested in Appl. Phys. Lett. 64, 12 (1994), J. Vac. Sci. Technol. B 15, 1506 (1997), and Appl. Phys. Lett. 85, 6398 (2004) that the leaf spring be excited using an ultrasonic transducer, in that the ultrasonic transducer is contacted with the sample to be examined on a side facing away from the sample surface. The ultrasonic transducer is connected to an external frequency generator, which supplies the transducer with a sinusoidal AC voltage, so that longitudinal and/or transverse waves are emitted into the sample and thus cause displacements perpendicular to the sample surface and/or along the surface. If the leaf spring is in contact with the sample surface via its tip, the oscillations are transmitted from the sample surface to the leaf spring, which begins to oscillate in bending and/or torsion and lateral modes. Contact resonances of the system sample-leaf spring are excited in this way, in which forces act between the tip of the leaf spring and the sample surface, due to which the resonances of the free leaf spring shift toward higher frequencies, the so-called contact resonances.

A method for measuring surface properties using AFM is disclosed in U.S. Pat. No. 6,006,593, in which the excitation of the leaf spring occurs at its suspension at the end of the leaf spring using an ultrasonic transducer which is connected to a frequency generator. This transducer transmits the oscillation to the leaf spring. If the leaf spring is in contact with the sample surface, contact resonances of the system sample-leaf spring may also be excited using this method. An ultrasonic transducer or the thermoelastic expansion of the suspension by an amplitude-modulated laser beam may be used as the transducer.

Contactless excitation technologies are also known, by which the leaf spring may be set into resonance oscillation. Thus, a method in this regard is disclosed in German Patent 103 21 931 B4, which is based on the finding that in the event of oscillation excitation of the sample surface into oscillations oriented laterally to the surface and linearly polarized along an oscillation direction as well as additional orientation of the leaf spring perpendicular to the oscillation direction over the sample surface, the leaf spring may be excited to oscillate by shear waves coupled into a gaseous coupling medium, such as air, located between the sample surface and the leaf spring.

Another approach is described by K. El Hami et al. in "Selective Excitation of the Vibration Modes of the Cantilever Spring", Sensors and Actuators A 64 (1998), 151-155. Polymer strips made of piezoelectric material are applied along the surface of the leaf spring, which are supplied with electrical AC voltage, by which the leaf spring is set into resonant oscillations.

A semiconductor voltage sensor is described in U.S. Pat. No. 6,211,540, which provides a leaf spring clamped on one side, whose flexion is detected using a sensor, which contains a Schottky contact. If the tip of the leaf spring scans a sample surface, the leaf spring is deflected and bending of the leaf spring occurs. The Schottky contact which is located on the leaf spring changes its electrical properties because of this deformation.

Similarly to the above publication, WO 97/24915 describes a micro-electromechanical system which has a deformable structure which is combined with a sensor element, which is implemented as a Schottky contact, for example.

SUMMARY OF THE INVENTION

The present invention is a device for oscillation excitation of a leaf spring, which is fastened on one side in an atomic force microscope and comprises semiconductor material, in such a way that with an oscillation excitation of the leaf spring it is reliably possible using the simplest possible technical means, even at higher frequencies, so that resonant oscillation modes of higher orders, that is, second or third order, may also be excited. The device particularly does not require any costly materials, and thus particularly does not require the use of piezoelectric materials, and may be implemented using simple methods.

The device according to the invention includes a leaf spring comprising a semiconductor material, which does not have any piezoelectric properties itself. Preferably silicon, which may be provided as p-doped, n-doped, or undoped, is suitable for this purpose. The leaf spring is at least sectionally connected to a metal layer to form a Schottky contact, to which an electrical AC voltage is applied. An electrical voltage source which is electrically connected to the metal layer is preferably used for this purpose. However, it is also possible alternatively or in combination to induce an electrical AC voltage acting in the Schottky contact range in the area of the Schottky contact using a suitable electrical field source. It has been shown that when an electrical AC voltage is applied in the Schottky contact range, free resonant oscillations form along the leaf spring, without having to use piezoelectric materials and the piezoelectric effect (which is known per se) connected thereto.

It is also possible, with a surface contact of the tip of the leaf spring with a sample, to excite contact resonances in the system sample-leaf spring by providing a Schottky contact.

By applying a metal layer to at least one leaf spring surface, a so-called Schottky barrier in the form of a space charge zone is provided inside the elastic bar comprising a semiconductor material, which forms as a depletion layer of charge carriers between the semiconductor and the metal layer. If an electrical AC voltage is applied to the Schottky contact, the size of the space charge zone changes as a function of the AC voltage, that is, it becomes larger and/or smaller. The change of the thickness of the formed space charge zone is connected to a lattice distortion of the semiconductor material, which may in turn have various causes. According to the current understanding of the effect to be observed for oscillation excitation of an elastic bar manufactured from semiconductor material while implementing a Schottky contact, it is assumed that the coupling to lattice distortions occurs via multiple coupling mechanisms, such as the so-called deformation potential. Thus, it may be observed that oscillations form in the area of the elastic bar which is coated by a metal layer, that is, in which the Schottky contact is located. Proceeding from this, the oscillations are transmitted to the entire leaf spring, even if it is only partially contacted with a corresponding metal layer.

Fundamentally, as already noted above, both natural modes of the free elastic bar and also contact resonances may be excited. In a preferred embodiment, providing an additional DC voltage source, whose DC voltage potential is applied to the Schottky contact superimposed on the AC voltage, ensures an increase or reduction, depending on the polarity of the DC voltage, of the depth dimension of the Schottky contact, by which the effectiveness of the excitation may be changed and set in a planned way.

BRIEF DESCRIPTION OF THE DRAWINGS

The present invention is described in the following on the basis of exemplary embodiments with reference to the drawings without restriction of the general idea of the invention.

DETAILED DESCRIPTION OF THE INVENTION

Figure 1A:
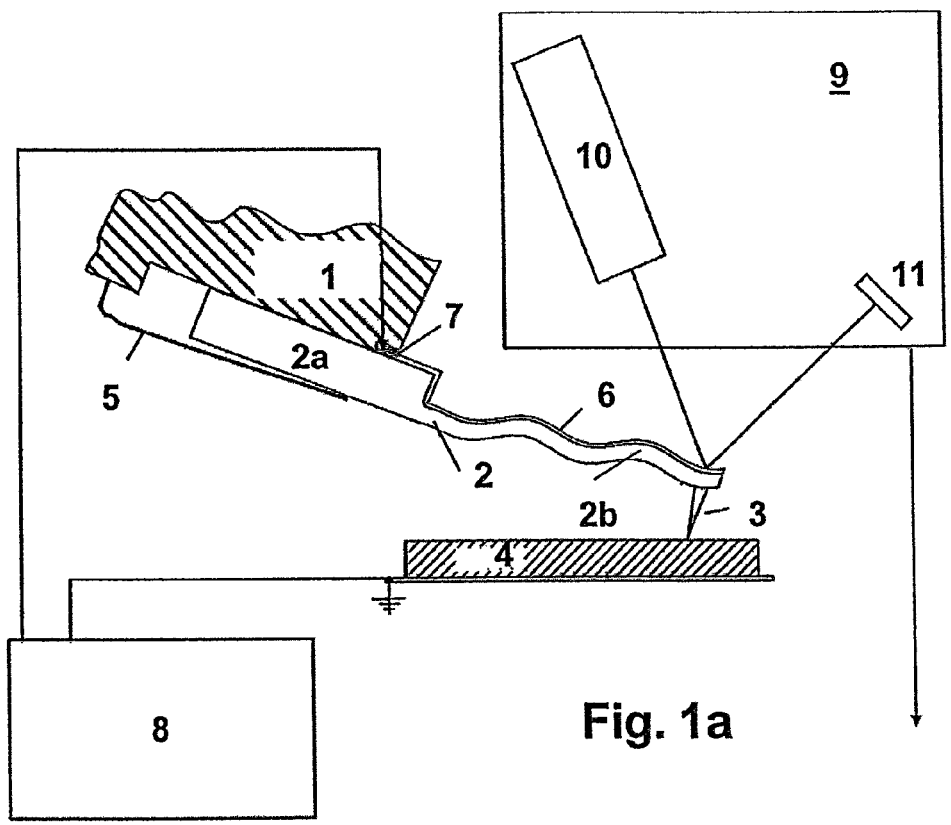
FIGS. 1$a$ and $b$ show a schematic illustration of a leaf spring, fastened to an atomic force microscope, having a metal-plated leaf spring surface.

Schematic side views of a leaf spring configuration 2, which may be brought into contact with the sample surface of a sample 4 via its sample tip 3, are shown in each of FIGS. 1$a$ and $b$. The leaf spring configuration 2 is manufactured in one piece from single-crystalline silicon and has a fastening section 2$a$, which is connected in the exemplary embodiment shown via a clamping device 5, impinged with spring force, on one side to a fixed buttress 1 of the atomic force microscope. The actual leaf spring 2$b$, on whose top side a metal layer 6 is deposited, which additionally also covers an area of the fastening section 2$a$, on which an electrical contact 7 is provided, which is connected to a voltage source 8, projects free on one end laterally over the fastening section 2$a$. The leaf spring configuration 2, which will be discussed in greater detail in FIGS. 2$a$ through 2$c$, is manufactured completely from single-crystalline silicon and is thus producible using silicon technology. For this reason, the fastening section 2$a$ is usually also referred to as a chip, from which the leaf spring 2$b$ projects as a web having a free end.

By depositing a metal layer 6 on the semiconductor surface of the leaf spring configuration, including the leaf spring top side, a Schottky contact is formed, which is distinguished as a depletion layer of charge carriers between semiconductor and the metal layer. If an AC voltage potential is applied to the metal layer 6 via the voltage source 8, the leaf spring 2$b$ begins to deform periodically because of occurring lattice distortions. By suitable selection of the alternating frequency of the applied AC voltage potential and as a function of the shape and size of the leaf spring 2$b$, the leaf spring begins to execute resonant oscillations without being in contact with an oscillating medium. The oscillation behavior of the leaf spring 2$b$ is detectable with the aid of a position detector 9, in that the light of a light source 10, preferably of a laser, reflected on the leaf spring top side is detected by a photodiode 11 and analyzed appropriately. The diode signals generated on the part of the photodiode are spectrally analyzed with the aid of a rapid login amplifier at a corresponding downstream digital oscilloscope in regard to amplitude and phase.

Alternatively to the metal plating of the leaf spring top side on only one side, it is also possible to coat the leaf spring configuration 2 both on the top side and also the bottom side with a corresponding metal layer 6 for the oscillation excitation. A construction of this type is shown in a side view in FIG. 1b. Reference is made to the reference numerals already explained and described with reference to FIG. 1a at this point to avoid repetition. A second contact point 7' is provided for voltage supply of the metal layer 6' provided on the bottom side, via which a corresponding voltage supply on the part of the voltage source 8 occurs.

Figure 1B:
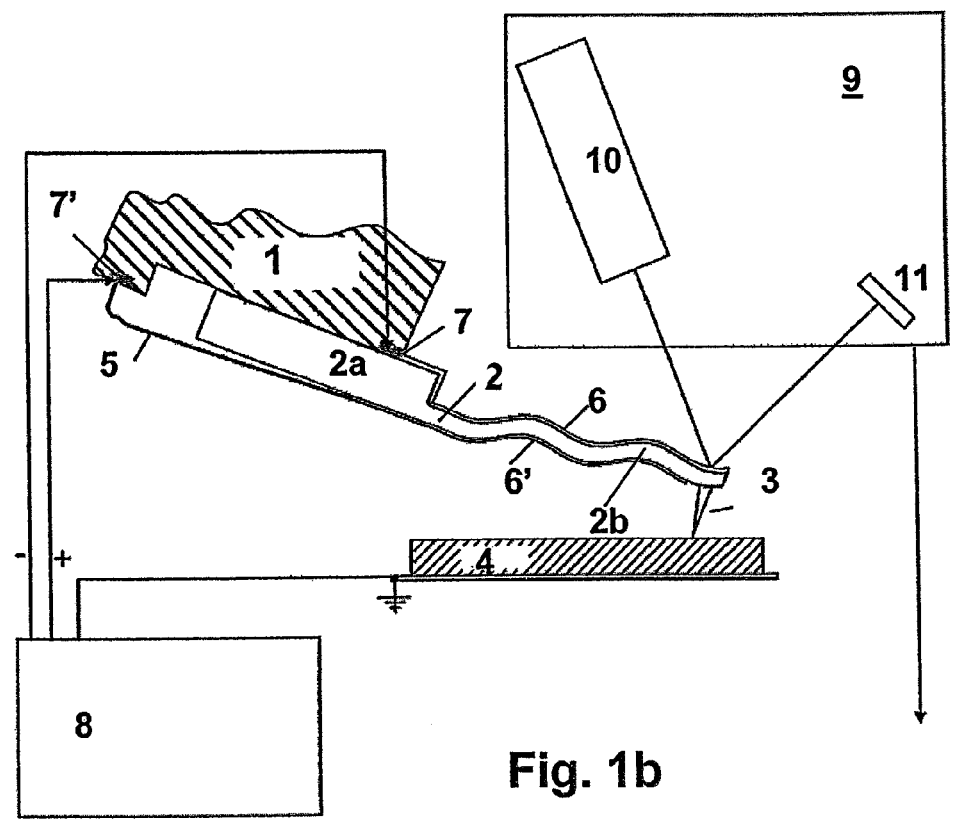

Both with the exemplary embodiment in FIG. 1a and also with a double-sided metal coating of the leaf spring configuration 2, it is possible to set the leaf spring 2b into oscillations without the sample tip 3 being in contact with the surface of the sample 4. As already noted, the oscillation behavior may be influenced by suitable frequency selection of the applied AC voltage potential. For this purpose, the voltage source 8 has a function generator for generating AC voltages at frequencies between 10 kHz and 5 MHz. In addition, the voltage source 8 has a DC voltage source for generating a DC voltage potential, for example, from −50 V to +50 V, which may be applied to the metal layer 6 in addition to the alternating frequency, that is, by addition to the AC voltage, to thus also have the amplitude of the oscillations forming along the leaf spring be influenced in a targeted way.

Figure 2A:
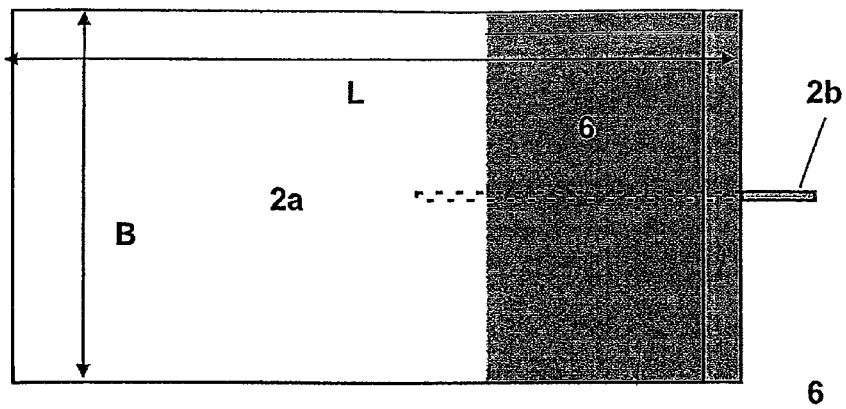
FIGS. 2$a$-$c$ show top and side views of a leaf spring having a metal layer which is integrated in a chip.
Figure 2A:
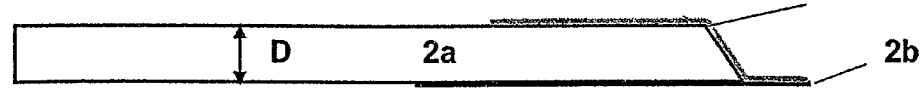
Figure 2B:
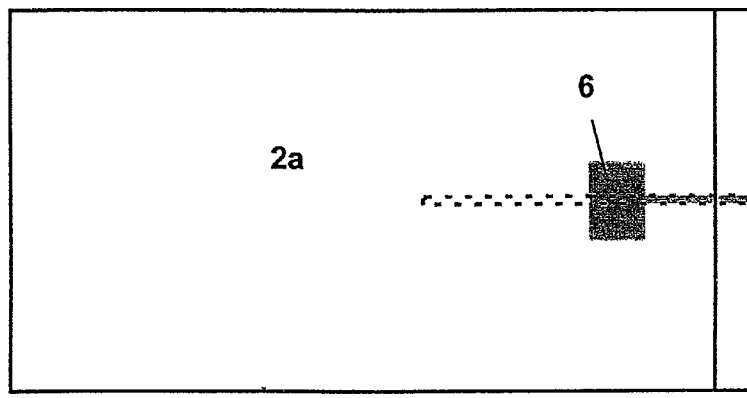
Figure 2B:
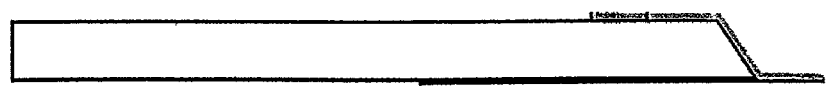
Figure 2C:
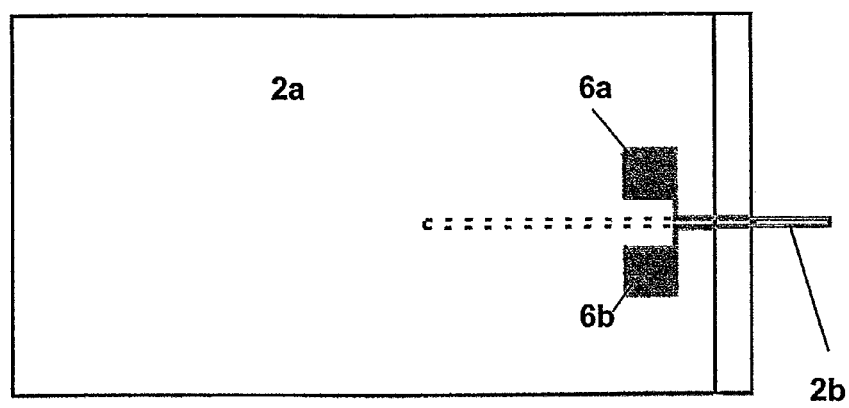
Figure 2C:
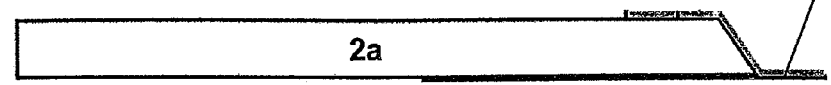

The top and side views of a leaf spring configuration 2 according to the illustrations in FIG. 2a through c show different implementations of the particular metal layer 6 deposited on the top side of the leaf spring configuration 2, which may be applied to the particular surface of the leaf spring configuration using deposition technologies known per se, such as vapor deposition, sputtering, electrical or unpowered metal deposition.

The leaf spring configuration 2 typically has a length L of 4 mm, a width B of approximately 2 mm, and a thickness D of approximately 300 μm in the fastening section 2a. The leaf spring 2b, which typically has a length l between 100 μm and 500 μm, a width b of 20 μm to 60 μm, and a thickness d of 1 μm to 10 μm, is connected in one piece to the fastening section 2a. The overall leaf spring configuration 2 has a homogeneous metal layer 6 on its end area facing toward the leaf spring 2b according to the exemplary embodiment in FIG. 2a, preferably in the form of a platinum or gold layer, which typically has a layer thickness of 100 nm to 1 μm. The top side of the leaf spring 2b facing toward the plane of the drawing in FIG. 2a is coated over its entire area with the metal layer 6.

Fundamentally, it is not necessary to cover the fastening section 2a with the metal layer 6 for oscillation excitation of the leaf spring section 2b. On the other hand, it requires corresponding contact areas, at which the metal layer 6 is electrically contacted. For this purpose, a small area is covered with a metal layer 6 in FIG. 2b only on the top side of the fastening section 2a, which is used for the electrical contacting of the metal layer completely covering the leaf spring top side 2b.

Two spatially separate electrode areas 6a and 6b are provided on the surface of the fastening section 2a in FIG. 2c, which are connected to spatially separate metal layers implemented as interdigital electrode structures, which are deposited on the surface of the leaf spring 2b. The implementation of the metal layer along the leaf spring surface in the form of interdigital electrodes or interdigital fingers results in excitation of torsion modes along the leaf spring 2b clamped on one side. Of course, it is possible to implement the contact areas 6a and 6b differently and to attach them in a different way to the surface of the fastening section 2a.

Figure 3A:
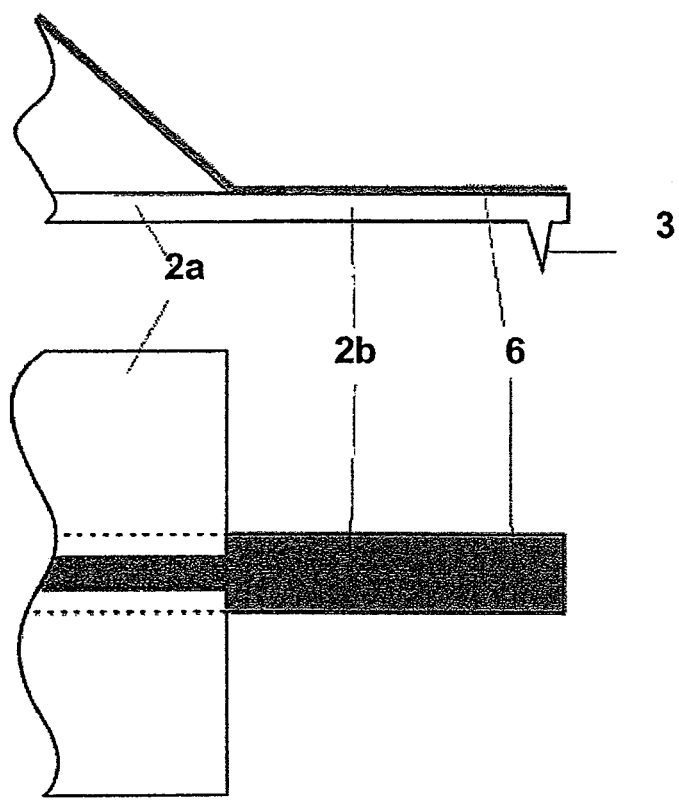
FIGS. 3$a$-$l$ show side and top views of a leaf spring having differently implemented metal layer configurations and/or metal layer implementations.

FIG. 3a shows a side and a top view of the leaf spring 2b, which presses on the left of the illustration in one piece into the leaf spring fastening section 2a and is implemented on the right in the illustration as a web having a free end. In the form illustrated in FIG. 3a, a metal layer 6 is applied to the entire area of the leaf spring top side, for example, using deposition technology. A Schottky contact forms between the leaf spring 2b, comprising single-crystalline silicon, and the metal layer 6 applied thereto, which preferably comprises platinum or gold, which, as explained that the beginning, results in a space charge zone which is a charge depletion zone. The charge depletion zone initiates oscillations along the web-like leaf spring 2b, on whose end the sample tip 3 is provided which in the presence of an electrical AC potential, causes lattice distortions to occur within the semiconductor material.

Figure 3B:
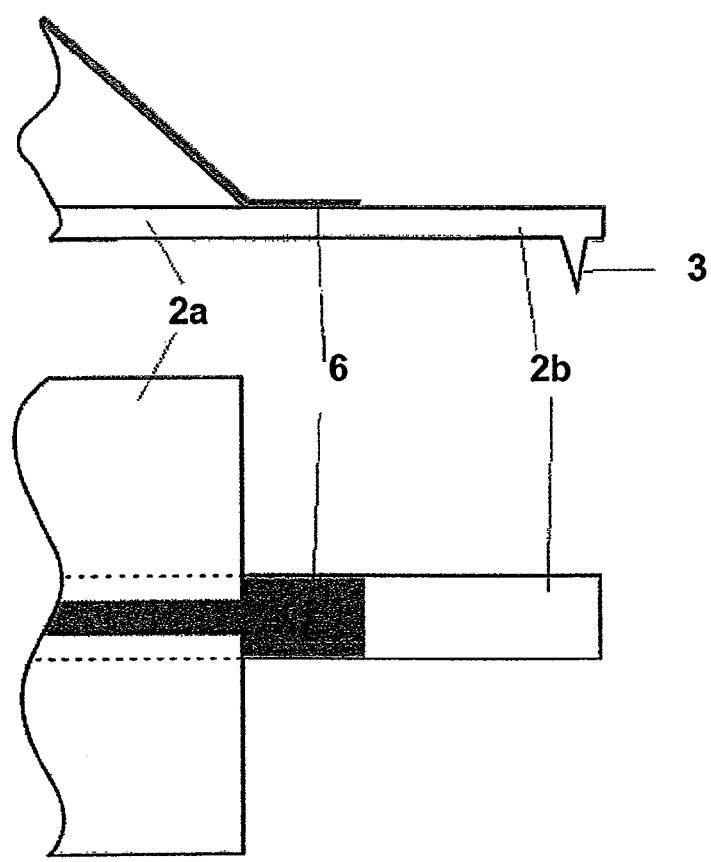

If, in contrast to the exemplary embodiment from FIG. 3a, the surface of the leaf spring 2b according to the exemplary embodiment in FIG. 3b is only partially covered with a metal layer 6, it has been shown that the first three free bending modes of the leaf spring section 2 may be excited preferentially. In addition, if the sample tip of the leaf spring 2b is in contact with the surface of the sample (not shown), it is additionally possible to implement the first three bending contact resonances between the metal layer 6 and the leaf spring 2b with the aid of the Schottky contact, to which is applied an AC voltage.

Figure 3C:
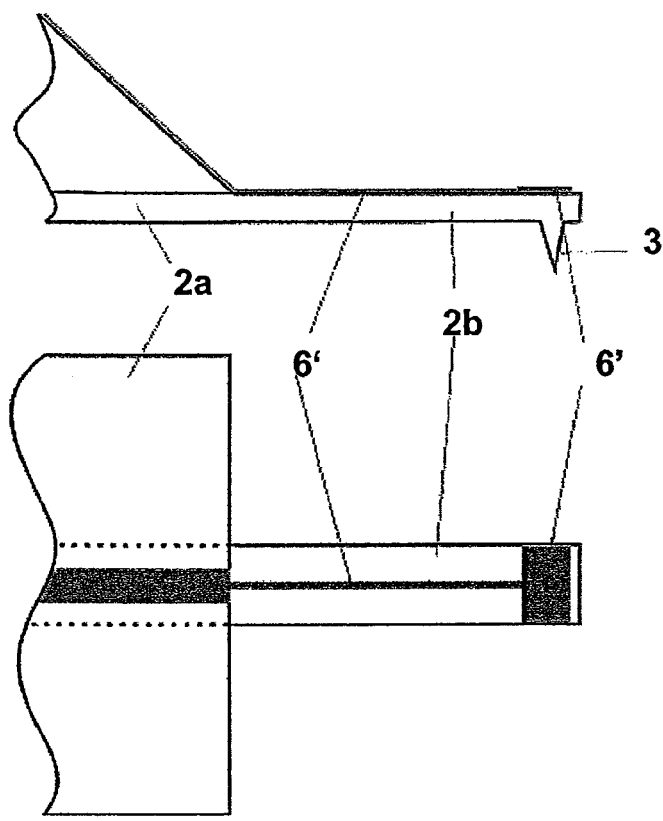
Figure 3D:
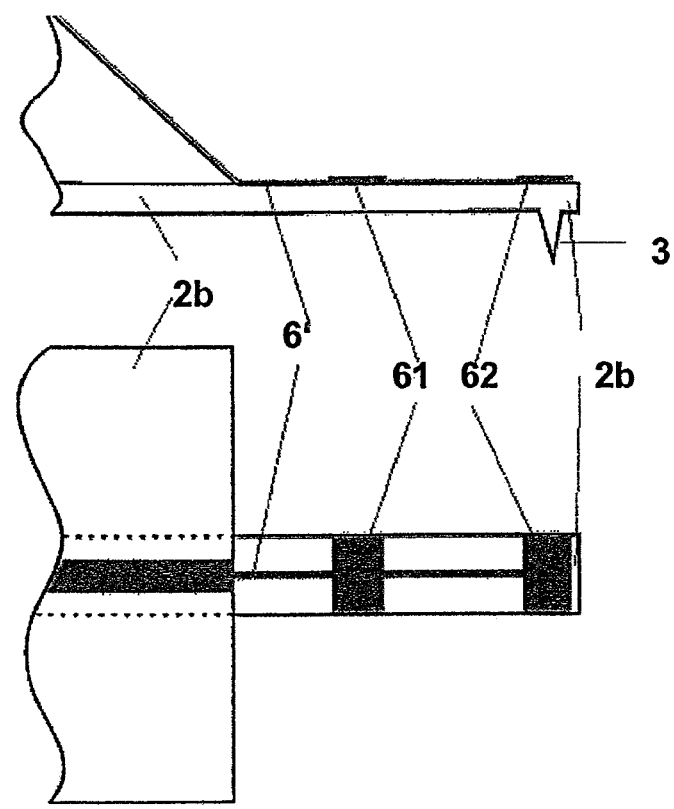

Experiments have shown that it is possible to excite the first bending mode of the leaf spring 2b preferentially if a local metal layer area 6' is deposited on the end of the leaf spring section 2b as shown in the illustration in FIG. 3c. A thin metal layer web 6' only runs on the top side of the leaf spring 2b for the electrical contacting of the metal layer area 6, which is implemented having as small an area as possible and thus has little influence on the formation of a Schottky contact. The excitation of the second bending mode may be achieved in a planned way with two metal layer fields 61 and 62 deposited at a distance from one another along the leaf spring 2b as shown in the illustration in FIG. 3d. One metal layer field 61 is located somewhat outside the middle of the leaf spring 2b and the second metal layer area 62 is located at the end area of the leaf spring 2b, directly opposite the sample tip 3. Both metal layer fields 61 and 62 are electrically contacted via an electrical connection line 6', which is implemented as narrowly as possible.

Figure 3E:
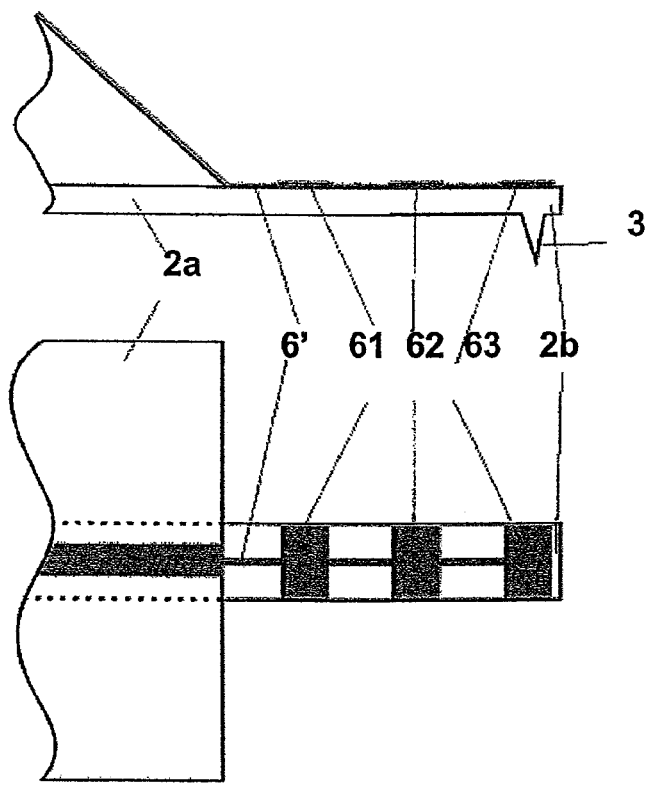
Figure 3F:
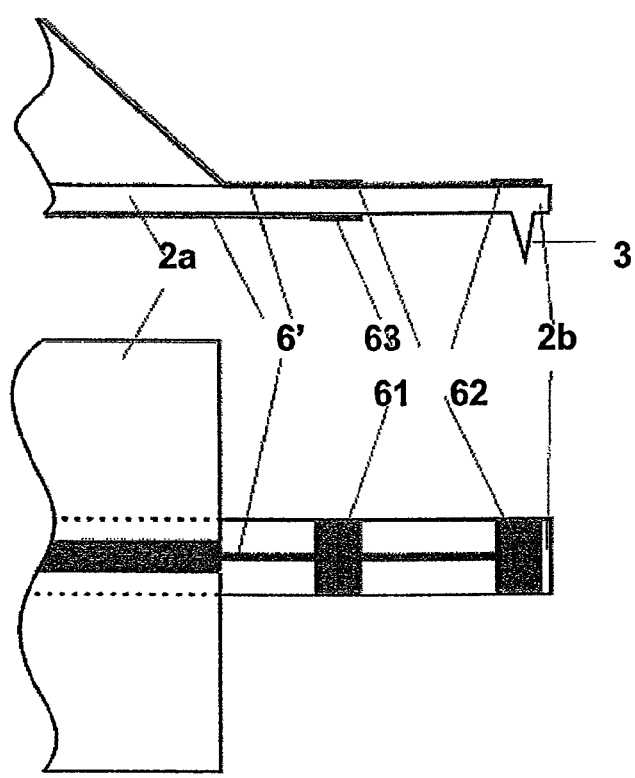

To implement the third bending mode of the leaf spring 2b, three metal layer fields 61, 62, 63 are provided along a top side of the leaf spring 2b as shown in the embodiment in FIG. 3e. Especially good results have also been obtained to provide the excitation of the second bending mode by providing two separate metal layer fields 61, 62 on the top side of the leaf spring 2b as shown in the embodiment in FIG. 3f and additionally applying a further metal layer field 63 to the bottom side of the leaf spring section 2b. The metal layer fields 61 and 63 are directly opposite each other and face.

Figure 3G:
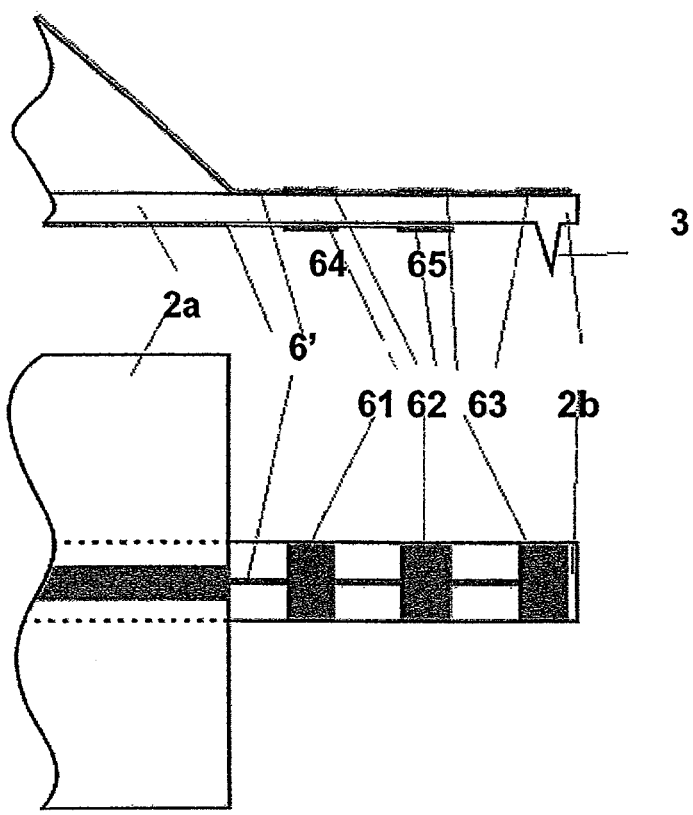
Figure 3H:
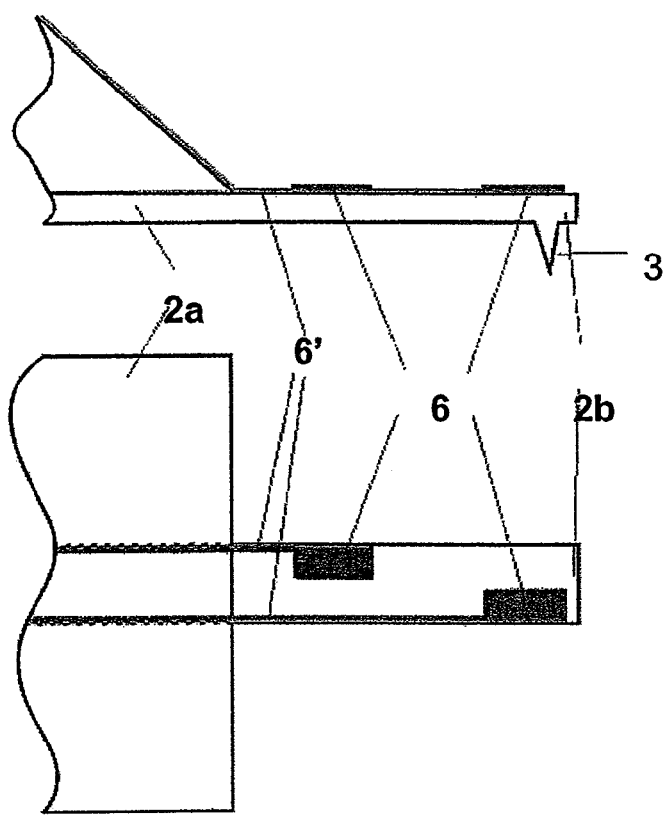

The implementation of the third bending mode in the leaf spring section 2b is according to the configuration in the embodiment in FIG. 3g. Electrode areas 61, 62, 63 and also 64 and 65 are also located on the top side and bottom side of the leaf spring section 2b.

Figure 3I:
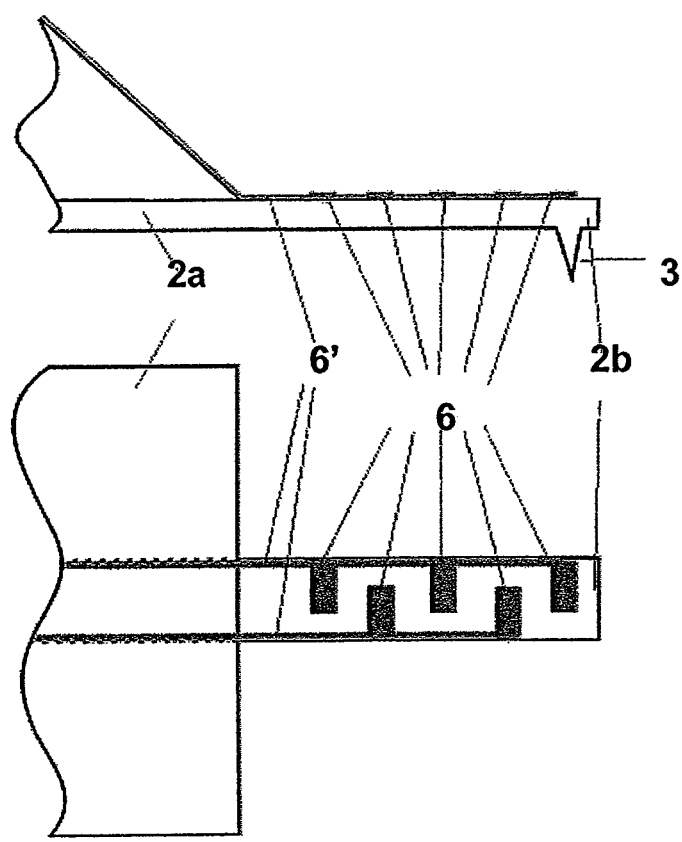

Finally, FIG. 3g shows a schematic illustration of the configuration of metal layers 6 implemented as interdigital fingers on the top side of the leaf spring 2b. Torsion modes may be excited using the metal layer configuration shown in FIG. 3g which preferably are the second mode. The embodiment in FIG. 3i shows an interdigital electrode configuration having five separate metal layer areas 6, which are provided on the top side of the leaf spring section 2b and are electrically contacted by narrow boundary metal platings 6', excite the fifth torsion mode of the leaf spring.

Fundamentally, it may be stated that the configuration of the metal coatings which are implemented depends on the mode excitation. It is also to be considered whether free resonances or contact resonances are to form along the leaf spring. According to the exemplary embodiment in FIGS. 3f and 3g, it may be shown that by additionally providing metal layer fields both on the top side and also on the bottom side, the oscillation excitation along the leaf spring may be amplified. If the metal layer fields are situated offset to one another on the top and bottom sides of the leaf spring, in contrast to the exemplary embodiment shown in FIGS. 3f and 3g, phase-shifted oscillation modes are implemented.

LIST OF REFERENCE NUMERALS 1 fastening area of the atomic force microscope
2 leaf spring
2a fastening section
2b leaf spring section
3 sample tip
4 sample
5 clamping device
6 metal layer
6' metal layer line
61-65 metal layer fields
7 contact point
7' contact point
8 voltage supply
9 position detector
10 light source, laser
11 photodiode

The invention claimed is:

1. A leaf spring for connection on one side of an atomic force microscope, the leaf spring comprising:
a tip attached to a free end of the leaf spring for contacting a sample surface to be studied by the atomic force microscope; and wherein
the leaf spring comprises a semiconductor material and a metal layer contacting the semiconductor material which provides a Schottky contact; and
an electrical voltage source or electrical field source which provides an electrical voltage in a vicinity of the Schottky contact to produce excitation of the leaf spring.

2. The leaf spring according to claim 1, wherein:
the leaf spring is a strip having two diametrically opposite leaf spring surfaces with at least one leaf spring surface being at least partially coated by the metal layer to form the Schottky contact which is flat.

3. The leaf spring according to claim 2, wherein:
the leaf spring comprises an n-doped, p-doped, or undoped semiconductor material.

4. The leaf spring according to claim 3, wherein:
the leaf spring comprises single-crystalline silicon.

5. The leaf spring according to claim 4, wherein:
the electrical voltage source or electrical field source generates an electrical DC voltage potential in the vicinity of the Schottky contact.

6. The leaf spring according to claim 4, wherein:
the metal layer is a homogeneous flat layer having a constant layer thickness.

7. The leaf spring according to claim 5, wherein:
the metal layer is a homogeneous flat layer having a constant layer thickness.

8. The leaf spring according to claim 3, wherein:
the electrical voltage source or electrical field source generates an electrical DC voltage potential in the vicinity of the Schottky contact.

9. The leaf spring according to claim 8, wherein:
the metal layer is a homogeneous flat layer having a constant layer thickness.

10. The leaf spring according to claim 3, wherein:
the metal layer is a homogeneous flat layer having a constant layer thickness.

11. The leaf spring according to claim 2, wherein:
the electrical voltage source or electrical field source generates an electrical DC voltage potential in the vicinity of the Schottky contact.

12. The leaf spring according to claim 11, wherein:
the metal layer is a homogeneous flat layer having a constant layer thickness.

13. The leaf spring according to claim 2, wherein:
the metal layer is a homogeneous flat layer having a constant layer thickness.

14. The leaf spring according to claim 1, wherein:
the leaf spring comprises an n-doped, p-doped, or undoped semiconductor material.

15. The leaf spring of claim 14, wherein:
the leaf spring comprises single-crystalline silicon.

16. The leaf spring according to claim 15, wherein:
the electrical voltage source or electrical field source generates an electrical DC voltage potential in the vicinity of the Schottky contact.

17. The leaf spring according to claim 16, wherein:
the metal layer is a homogeneous flat layer having a constant layer thickness.

18. The leaf spring according to claim 15, wherein:
the metal layer is a homogeneous flat layer having a constant layer thickness.

19. The leaf spring according to claim 14, wherein:
the electrical voltage source or electrical field source generates an electrical DC voltage potential in the vicinity of the Schottky contact.

20. The leaf spring according to claim 19, wherein:
the metal layer is a homogeneous flat layer having a constant layer thickness.

21. The leaf spring according to claim 14, wherein:
the metal layer is a homogeneous flat layer having a constant layer thickness.

22. The leaf spring according to claim 1, wherein:
the electrical voltage source or electrical field source generates an electrical AC or DC voltage potential in the vicinity of the Schottky contact.

23. The leaf spring according to claim 22, wherein:
the metal layer is a homogeneous flat layer having a constant layer thickness.

24. The leaf spring according to claim 1, wherein:
the metal layer is a homogeneous flat layer having a constant layer thickness.

25. The leaf spring according to claim 1, comprising:
a structured metal layer.

26. The leaf spring according to claim 25, wherein:
the structured metal layer comprises CMOS.

27. The leaf spring according to claim 1, wherein:
the metal layer has a thickness ranging from 100 nm to 1 μm, a thickness of the leaf spring ranges from 1 μm and 10 μm, a length of the leaf spring ranges from 100 μm and 500 μm, and a width of the leaf spring ranges from 20 μm and 60 μm.

28. The leaf spring according to claim 1, wherein:
the metal layer comprises platinum or gold.

* * * * *